United States Patent [19]

Heine et al.

[11] 4,252,857
[45] Feb. 24, 1981

[54] FLAMEPROOFING SUBSTRATE

[75] Inventors: Heinrich Heine; Gerhard Winter, both of Krefeld; Hans-Dieter Block, Cologne, all of Fed. Rep. of Germany

[73] Assignee: Bayer Aktiengesellschaft, Leverkusen, Fed. Rep. of Germany

[21] Appl. No.: 65,686

[22] Filed: Aug. 10, 1979

Related U.S. Application Data

[63] Continuation of Ser. No. 883,982, Mar. 6, 1978, abandoned.

[30] Foreign Application Priority Data

Mar. 10, 1978 [DE] Fed. Rep. of Germany ....... 2710498

[51] Int. Cl.$^3$ .............................................. C09D 5/18
[52] U.S. Cl. ................... 428/411; 106/18.14; 106/18.18; 252/8.1; 428/921
[58] Field of Search .......................... 106/18.14, 18.18; 252/8.1; 428/920, 921, 411

[56] References Cited

U.S. PATENT DOCUMENTS

| | | | |
|---|---|---|---|
| 3,471,552 | 10/1969 | Budnick | 260/502.4 P |
| 3,933,427 | 1/1976 | Bohnsack et al. | 252/181 |
| 3,957,858 | 5/1976 | Kerst | 252/8.1 |
| 4,020,091 | 4/1977 | Budnick | 260/502.4 P |
| 4,033,896 | 7/1977 | Mitchell et al. | 21/2.7 A |
| 4,077,997 | 3/1978 | Blum et al. | 252/180 |

Primary Examiner—Lorenzo B. Hayes
Attorney, Agent, or Firm—Sprung, Felfe, Horn, Lynch & Kramer

[57] ABSTRACT

Steel, wood and other structural elements and substrates are flameproofed by being coated with a composition comprising at least one metal salt of a phosphonocarboxylic or phosphonophosphonic acid of the formula

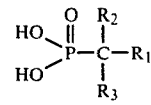

in which $R_1$ = a carboxy group, a phosphono group, an alkyl, alkoxy or alkylamino radical optionally substituted one or more times by oxygen and/or nitrogen and containing at least one substituent from the group comprising the substitutents —COOH and —PO$_3$H$_2$, the alkyl group containing from 1 to 12 carbon atoms, preferably from 1 to 4 carbon atoms, and the sum of the number of carboxyl and phosphono groups being from 1 to 8, preferably from 1 to 4; or a hydroxyalkyl or aminoalkyl radical containing from 1 to 12 and preferably from 1 to 4 carbon atoms, $R_2$ = hydrogen, chlorine, bromine, an alkyl radical with 1 to 12 carbon atoms, preferably with 1 to 4 carbon atoms; a hydroxyl, amino, acylamino such as $C_{1-4}$-alkanoylamino, ureido, carbamoyl, phenyl, carboxyl or phosphono group, $R_3$ = hydrogen, chlorine, bromine, an alkyl radical with 1 to 12 carbon atoms, preferably with 1 to 4 carbon atoms, a phenyl radical or the groups mentioned for $R_1$, but independently of $R_1$, and $R_2$ and $R_3$ together may, with the carbon atom to which they are attached, form a 5- to 7-membered carbocyclic ring which may optionally be interrupted by nitrogen, or $R_2$ and $R_3$ together may represent an alkylene radical, preferably a methylene radical, or a $C_{1-4}$, preferably $C_{1-2}$, alkylene radical optionally substituted by phosphono groups and/or carboxyl groups; or together $R_2$ and $R_3$ may represent a double-bonded oxygen atom.

Upon heating, the salt forms a foam which protects the substrate.

6 Claims, No Drawings

FLAMEPROOFING SUBSTRATE

This is a continuation of Ser. No. 883,982, filed 3/6/78, now abandoned.

This invention relates to flameproofing agents and to a process for producing insulating layers containing these flameproofing agents which expand under the action of heat and, in doing so, form foams which have a low thermal conductivity and which, in the expanded state, are resistant to high temperatures or at least are capable of withstanding high temperatures for a while.

In fire prevention, precautionary measures are normally taken with a view to preventing or at least delaying the outbreak or spreading of a fire. Thus, it is known that objects exposed to the danger of fire can be protected with materials based on aluminum oxide and chromium oxide. It is also known to include aluminum phosphate solutions or 80% phosphoric acid in materials such as these German Auslegeschrift No. 2,502,930 for example relates to fireproof materials based on aluminum oxide and alkaline-earth metal phosphates as binder which undergo permanent expansion on heating. Expandable compositions based on ammonium polyphosphates and materials which carbonize under the action of heat and give a carbon foam are also known. By virtue of the heat-insulating foam which they form, expandable flameproofing agents such as these prevent the further access of air to the object, thereby interrupting combustion of the material. Non-inflammable gases, such as nitrogen or carbon dioxide, are formed during the collapse of the flame proofing agents and the simultaneous formation of the foam.

The present invention provides flameproofing agents which are characterized by the fact that they contain metal salts of one or more phosphonocarboxylic acids and/or phosphonic acids.

The present invention also provides a process for the production of flameproofed insulating layers based on binders and additives, wherein metal salts of one or more phosphonocarboxylic acids and/or phosphonic acids are added to the mixture or to one or more of the individual components required for the mixture.

It has surprisingly been found that the organic phosphorus compounds described below are suitable for the production of expanding foams. These phosphorus compounds are neutral and/or acid salts of phosphonic acids and/or phosphonocarboxylic acids with divalent or trivalent metals which may be used either individually or in admixture with one another. The metals used are $Mg^{2+}$, $Ca^{2+}$, $Sr^{2+}Cr^{3+}$, $Al^{3+}Zn^{2+}$, $Fe^{2+}$, $Fe^{3+}$, preferably magnesium and zinc salts and more particularly acid magnesium and/or acid zinc salts.

In the context of the present invention, phosphonic acids and/or phosphonocarboxylic acids are mono-, di-, tri- and poly-acids and their derivatives which may be represented by the following formula

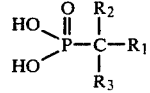

in which the radicals $R_1$, $R_2$ and $R_3$ have the following meaning:

$R_1$ = a carboxy group, a phosphono group, an alkyl, alkoxy or alkylamino radical optionally interrupted one or more times by oxygen and/or nitrogen and containing at least one substituent from the group comprising the substituents —COOH and —$PO_3H_2$, the alkyl group containing from 1 to 12 carbon atoms, preferably from 1 to 4 carbon atoms, and the sum of the number of carboxyl and phosphono groups being from 1 to 8, preferably from 1 to 4; or a hydroxyalkyl or aminoalkyl radical containing from 1 to 12 and preferably from 1 to 4 carbon atoms, $R_2$ = hydrogen, chlorine, bromine, an alkyl radical with 1 to 12 carbon atoms, preferably with 1 to 4 carbon atoms; an hydroxyl, amino, acylamino such as $C_{1-4}$-alkanoylamino, ureido, carbamoyl, phenyl, carboxyl or phosphono group, $R_3$ = hydrogen, chlorine, bromine, an alkyl radical with 1 to 12 carbon atoms, preferably with 1 to 4 carbon atoms, a phenyl radical or the groups mentioned for $R_1$, but independently of $R_1$, and $R_2$ and $R_3$ together may, with the carbon atom to which they are attached, form a 5- to 7-membered carbocyclic ring which may optionally be interrupted by nitrogen, or $R_2$ and $R_3$ together may represent an alkylene radical, preferably a methylene radical, or a $C_{1-4}$, preferably $C_{1-2}$, alkylene radical optionally substituted by phosphono groups and/or carboxyl groups; or together $R_2$ and $R_3$ may represent a double-bonded oxygen atom.

Acids such as these include, for example, the following acids: phosphonoacetic acid, methyl phosphonoacetic acid, ethyl phosphonoacetic acid, phosphonosuccinic acid, 1-methyl phosphonosuccinic acid, 1-ethyl phosphonosuccinic acid, 2-methyl phosphonosuccinic acid, phosphonoglutaric acid and its derivatives, phosphonoadipic acid and its derivatives, phosphonoethane-1,2-dicarboxylic acid, 1-phosphonopropane-1,2-dicarboxylic acid, 1-phosphonopentane-1,2-dicarboxylic acid, 2-phosphonopropane-2,3-dicarboxylic acid, 2-phosphonopentane-1,2-dicarboxylic acid, 2-phosphonobutane-2,3-dicarboxylic acid, 2-phosphonopentane-2,3-dicarboxylic acid, 4-phosphonooctane-4,5-dicarboxylic acid, 2-phosphonobutane-1,2,4-tricarboxylic acid, 2-phosphonopentane-1,2,4-tricarboxylic acid, 2-phosphonohexane-1,2,4-tricarboxylic acid, 2-phosphonoheptane-1,2,4-tricarboxylic acid, 3-phosphonopentane-2,3,5-tricarboxylic acid, 3-phosphonoheptane-1,3,4-tricarboxylic acid, 3-phosphonohexane-2,3,5-tricarboxylic acid, 4-phosphonooctane-3,4,6-tricarboxylic acid, 5-phosphonononane-4,5,7-tricarboxylic acid, 3-phosphonooctane-2,3,5-tricarboxylic acid, 1,3-diphosphonobutane-3,4-dicarboxylic acid, 2,4-diphosphonopentane-4,5-dicarboxylic acid, 3,5-diphosphonohexane-5,6-dicarboxylic acid, 2,4-diphosphonoheptane-1,2-dicarboxylic acid, 1,3-diphosphonopentane-3,4-dicarboxylic acid, 1,3-diphosphonohexane-3,4-dicarboxylic acid, 2,4-diphosphonohexane-4,5-dicarboxylic acid, 3,5-diphosphonooctane-5,6-dicarboxylic acid, 3,5-diphosphonononane-5,6-dicarboxylic acid, 3,5-diphosphonooctane-2,3-dicarboxylic acid, 1,3-diphosphonobutane-2,3,4-tricarboxylic acid, 1,3-diphosphonopentane-2,3,4-tricarboxylic acid, 1,3-diphosphonoheptane-2,3,4-tricarboxylic acid, 1-phosphonopropane-1,2,3-tricarboxylic acid, 2-phosphonobutane-2,3,4-tricarboxylic acid, 3-phosphonopentane-1,2-3-tricarboxylic acid, 3-phosphonohexane-1,2,3-tricarboxylic acid, 4-phosphonoheptane-2,3,4-tricarboxylic acid, 2-phosphonohexane-2,3,4-tricarboxylic acid, 4-phosphonononane-4,5,6-tricarboxylic acid, 2-phosphonopentane-2,3,4-tricarboxylic acid, 3-phosphonoheptane-3,4,5-tricarboxylic acid, 1-phosphono-2-methyle-propane-1,2,3-tricarboxylic acid, 2-phosphono-3-ethyle-butane-2,3,4-tricarboxylic acid, 3-phosphono-4-methyle-pentane-3,4,5-tricarboxylic acid, 4-phosphono-5-propyle-hexane-4,5,6-tricarboxylic acid, 2-phosphono-3-methyle-hexane-2,3,4-tricarboxylic acid, 4-phosphono-5-methyle-nonane-4,5,6-tricarboxylic acid, 1-phosphono-2-methyle-pentane-1,2,3-tricarboxylic acid, 2-phosphono-3-methyle-pentane-2,3,4-tricarboxylic acid, 3-phosphono-4-ethyle-heptane-3,4,5-tricarboxylic acid, 1,1-diphosphono-propane-2,3-dicarboxylic acid, 2,2-diphosphono-butane-3,4-dicarboxylic acid, 3,3-diphosphono-pentane-4,5-dicarboxylic acid, 3,3-diphosphono-hexane-1,2-dicarboxylic acid, 2,2-diphosphono-pentane-3,4-dicarboxylic acid, 4,4-diphosphono-heptane-2,3-dicarboxylic acid, 1,1-diphosphono-pentane-2,3-dicarboxylic acid, 3,3-diphosphono-heptane-4,5-dicarboxylic acid, 1,1-diphosphono-2-methyle-propane-2,3-dicarboxylic acid, 2,2-diphosphono-3-methyle-butane-3,4-dicarboxylic acid, 2,2-diphosphono-3-methyle-pentane-3,4-dicarboxylic acid, 3,3-diphosphono-4-ethyleheptane-4,5-dicarboxylic acid, 2,2-diphosphono-3-propyle-heptane-3,4-dicarboxylic acid, 1-phosphonobutane-2,3,4-tricarboxylic acid, 1-phosphonopentane-2,3,4-tricarboxylic acid, 1-phosphono-3-methyl-pentane-2,3,4-tricarboxylic acid, 1-phosphono-3-methyl-heptane-2,3,4-tricarboxylic acid, 1-phosphono-3-propyl-hexane-2,3,4-tricarboxylic acid, 1-phosphono-3-methyl-butane-2,3,4-tricarboxylic acid, 1-phosphono-3-propyl-butane-2,3,4-tricarboxylic acid, phosphonopropionic acid, phosphonomaleic acid, 2-phosphonobutane-1,2,3,4-tetracarboxylic acid, 2-phosphonobutane-1,2,4,4-tetracarboxylic acid, 2-phosphonopentane-1,2,4-tricarboxylic acid, 3-phosphonopropane-1,1-dicarboxylic acid, 3,3-dicarboxypentane-1,5-diphosphonic acid, 2-phosphonoethane-1,1-dicarboxylic acid, 1,2-diphosphonosuccinic acid, 4-phosphonobutane-2,3,4-tricarboxylic acid, 1,3,5-tricarboxypentane-3-phosphonic acid, 1-phosphonopropane-1,2,3-tricarboxylic acid, 1-phosphonobutane-2,3,4-tricarboxylic acid, 1,1-diphosphonopropane-2,3-dicarboxylic acid, 3-phosphonobutane-1,2,3-tricarboxylic acid, 3,3-diphosphonobutane-1,2-dicarboxylic acid, 1,3-dicarboxypropane-1-phosphonic acid, 2-carboxypropane-1-phosphonic acid, 1-carboxypropane-2-phosphonic acid, polyvinyl phosphonic acid, vinyl phosphonic acid-acrylic acid copolymers, methane diphosphonic acid, ethane-1,2-diphosphonic acid, ethane-1,1-diphosphonic acid, propane-1,3-diphosphonic acid, butane-1,4-diphosphonic acid, ethane-1,2-diphosphonic acid, ethane-1,1-diphosphonic acid, 1-hydroxyethane-1,1-diphosphonic acid, 1-hydroxymethane-diphosphonic acid, 1-hydroxypropane-1,1-diphosphonic acid, 1-hydroxy-1-phenyl-methane diphosphonic acid, 1-chloro-1-phenyl-methane diphosphonic acid, dichloromethane diphosphonic acid, 1-aminoethane-1,1-diphosphonic acid, 1-aminomethane-1,1-diphosphonic acid, 1-morpholino-ethane-1,1-diphosphonic acid, dimethylaminomethane diphosphonic acid, substituted and cyclic 1-aminoethane-1,1,-diphosphonic acids, N-methyl-pyrrolidone-5,5-diphosphonic acid, 1,4-diaminobutane-1,1,4,4-tetraphosphonic acid and other alkane-$\alpha,\omega$-bis-aminodiphosphonic acids, 1-formamidinoethane-1,1-diphosphonic acid, 1-carbamoyl-ethane-1,1-diphosphonic acid, 1-ureidoethane-1,1-diphosphonic acid, N-carboxymethyl-1-aminoalkane-1,1-diphosphonic acid, 1,2-dihydroxyethane-1,1-diphosphonic acid, 1-hydroxy-2-aminoethane-1,1-diphosphonic acid, carbonyl diphosphonic acid, 1-acetamidinoethane-1,1-diphosphonic acid, nitrilo-tris-methylene phosphonic acid, aminoacetic acid-N,N-bis-methylene phosphonic acid, ethylene diamine tetramethylene phosphonic acid, hexamethylene diamine-tetrakis-methylene phosphonic acid, tetramethylene triamine-pentakis-methylene phosphonic acid, ethylene diamine-mono-$\beta$-propionic acid-tris-(methylenephosphonic acid), 1-hydroxy-3-aminopropane-1,1-diphosphonic acid, azacycloalkane-2,2-diphosphonic acids, dialkylaminomethane triphosphonic acids, phosphonoether carboxylic, piperidino-6,6-diphosphonic acid and cyclic aminophosphonic acids.

The choice of the particular flameproofing agents to be used is largely determined by their availability and economy, and it is for this reason that the salts of phosphonopropionic acid and phosphonosuccinic acid are preferably used.

The phosphonates may be foamed together with fillers, for example with waterproof substances, such as kaolin, alumina, alumina hydrate, zinc oxide, asbestos powder, glass powder, quartz powder, calcium sulphates and pigments. Known blowing agents, for example urea, dicyanodiamide, melamine and the like, may also be mixed in, giving different foam structures according to the decomposition temperature of the blowing agent and the phosphonate.

In combination with binders such as, resins, lacquers, particularly alkyd resin, chlorinated rubber, polyurethane, epoxide resin, celluloid, acid-catalyzed lacquers, lacquers based on vinyl polymers (solutions and aqueous dispersions) and lacquers based on cellulose esters and cellulose ethers, the powders or powder mixtures may be processed to form surfacing compositions and, with a larger proportion of binder, even coating compositions. To this end, the flame-proofing agents according to the present invention are added to and mixed with the binders in quantities of from 10 to 80% by weight.

The phosphonates according to the invention and the mixtures and preparations produced from them have proved to be effective flameproofing substances. By foaming, they thermally insulate the substrate to which they are applied. Foaming is also desirable in cases where it is necessary in case of fire to seal off empty spaces left for example in the case of installation bridges from one floor to the other or from one fire-prevention section to the other.

Accordingly, the invention also relates to the use of the flameproofing agents according to the invention for protecting objects exposed to the danger of fire, for example steel constructions, wood and organic shaped structures. The flameproofing composition may be applied in any desired thickness or weight per unit area, depending upon the extent of flameproofing desired and the thickness of foam layer desired to be built up. For most purposes, a thickness of about 0.2 to 3.0 and preferably about 0.5 to 1.0 mm is adequate.

The invention is illustrated by the following examples, in which the powder mixture or a coating composition produced therefrom was applied to a metal plate and placed in a muffle furnace or directly exposed to a natural-gas flame in order to test its foamability under thermal stressing. Coatings on wood were directly exposed to a natural gas flame.

EXAMPLE 1

192.5 g of 40% phosphonopropionic acid were mixed with 200 ml of distilled water in a 1 liter spherical flask equipped with a stirrer, reflux condenser and thermometer, and the resulting mixture was heated to 60° C.–70° C. 29.2 g of basic Zn-carbonate were then introduced incrementally into this mixture with stirring. After all the basic Zn-carbonate had been introduced, the mixture was heated to approximately 100° C. (reflux) and left for 1 hour at 100° C. After cooling, the contents of the flask, which consisted of a deposit and a liquid phase, were concentrated by evaporation to dryness under reduced pressure in a rotary evaporator, after which the solid salt was dried in a drying cabinet at 110° C. to 120° C. until constant in weight and subsequently ground in a mill. The yield amounted to approximately 95 g.

A largely fine-pored, light brown 20 mm thick foam layer was obtained from a 2 mm thick powder layer on a metal plate during the heat treatment in the muffle furnace at 300° C. A black 30 mm thick foam layer which adhered firmly to the substrate was formed during heat treatment at a temperature of up to 450° C.

EXAMPLE 2

A mixture of 80% by weight of an acid zinc phosphonopropionate (produced as in Example 1) and 20% of dicyandiamide was prepared. Foaming was carried out in the same way as described in Example 1. During the heat treatment at 300° C., the powder layer expanded to form a fairly uniform, brownish colored foam layer which was approximately 35 mm thick and which adhered firmly to the plate and did not melt off even when subsequently exposed to a naked flame.

EXAMPLE 3

A mixture of 80% by weight of an acid zinc phosphonopropionate (produced as described in Example 1) and 20% by weight of melamine was prepared. Foaming was carried out in the same way as in Example 1. During the heat treatment at 300° C., the powder layer expanded to form a brown colored foam layer which was approximately 35 mm thick and which firmly adhered to the plate.

On heating to 450° C., the powder layer expanded to form a black C-containing foam layer approximately 45 mm thick which adhered firmly to the plate.

EXAMPLE 4

A mixture of 95% by weight of an acid zinc phosphonopropionate (produced as described in Example 1) and 5% by weight of asbestos powder was prepared. Heat treatment in an electrically heated muffle furnace at 300° C. produced a black carbon-containing, foam layer which was approximately 35 mm thick and which firmly adhered to the plate.

When the same mixture was heated to 450° C. in the electrically heated muffle furnace, the powder layer expanded to form a black carbon-containing foam layer which was approximately 30 mm thick and which adhered firmly to the plate.

EXAMPLE 5

A mixture of 95% by weight of an acid zinc phosphonopropionate (produced as described in Example 1) and 5% by weight of Al(OH)$_3$ heated to 200° C. was prepared. When heat-treated in an electrically heated muffle furnace at 450° C., the powder layer expanded to form a black foam layer which was approximately 42 mm thick and which adhered firmly to the plate.

EXAMPLE 6

198.1 g of 50% phosphonosuccinic acid were mixed with 300 ml of distilled water in a 1 liter spherical flask equipped with a stirrer, a reflux condenser and a thermometer, and the resulting mixture was heated to 60° C. 29.2 g of basic zinc carbonate were then introduced incrementally into this mixture with stirring, after which the mixture was heated to around 100° C. (reflux) and kept at that temperature for 1 hour. After cooling, the contents of the flask were concentrated to dryness by evaporation under reduced pressure in a rotary evaporator. The solid salt was then dried in a drying cabinet at 110° C. to 120° C. until constant in weight and subsequently ground in a ball mill. The yield amounted to 95.6 g. (=82.9%) of the theoretical yield).

The heat treatment of a 2 mm thick powder layer in a muffle furnace at 300° C. produced a black foam layer which was approximately 55 mm thick and which adhered firmly to the plate. Heat treatment of the same salt powder in an electrically heated muffle furnace at 450° C. produced a black foam layer 28 mm thick which adhered firmly to the plate.

EXAMPLE 7

192.5 g of 40% phosphonopropionic acid were mixed with 300 ml of distilled water in a 1 liter spherical flask equipped with a stirrer, reflux condenser and thermometer and the resulting mixture was heated to 60° C.–70° C. A mixture of 29.3 g of basic zinc carbonate and 24.6 g of basic Mg-carbonate were then introduced incrementally into this mixture with stirring. After all the mixture had been introduced, the contents of the flask were heated to approximately 100° C. (reflux) and left at that temperature for 1 hour. After cooling, the contents of the flask were concentrated by evaporation under reduced pressure to dryness in a rotary evaporator, after which the solid salt was dried in a drying cabinet at 110° to 120° C. until constant in weight and subsequently ground in a mill. A mixture of 80% by weight of the above-described acid Zn-Mg-phosphonopropionate and 20% by weight of urea was prepared. It was applied to a metal layer in a layer thickness of 2 mm and heated to 300° C. in an electrically heated muffle furnace. A largely fine-pored light brown 20 mm thick foam layer which adhered firmly to the plate was formed.

EXAMPLE 8

192.5 g of a 40% phosphonopropionic acid were mixed with 400 ml of distilled water in a 1 liter spherical flask equipped with a stirrer, a reflux condenser and a thermometer and the resulting mixture was heated to 60°–70° C. 13.9 g of iron powder were introduced incrementally into this mixture with stirring. After all the Fe had been added, the contents of the flask were left for 1 hour at 100° C. After cooling, the contents of the flask were introduced into a rotary evaporator where they were concentrated by evaporation to dryness under reduced pressure in a nitrogen atmosphere, the solid salt was dried in a drying cabinet at 110° C.–120° C. until constant in weight and subsequently ground in a mill.

A mixture of 80% by weight of this acid iron phosphono proprionate and 20% by weight of urea was prepared. This mixture was applied to a metal plate in a layer thickness of 2 mm and heated to 300° C. in an electrically heated muffle furnace. A black, glossy foam layer approximately 25 mm thick which adhered firmly to the plate was formed.

EXAMPLE 9

140 g of acid Zn-phosphonopropionate according to Example 1 were mixed with 100 g of diluted celluloid lacquer (~15% of lacquer +85% of ethylacetate to form a surfacing composition. This composition was uniformly applied to a metal plate in a layer thickness of 1 mm and dried at room temperature. The plate was then heated to 300° C. in an electrically heated muffle furnace, resulting in the formation of a largely uniform black foam layer approximately 45 mm thick which adhered firmly to the plate.

Coating compositions were obtained by using a smaller proportion of zinc phosphonopropionate. The required layer thickness of the coating was obtained by repeating the coating one or more times.

EXAMPLE 10

A plant containing zinc phosphonopropionate (produced as described in Example 1) and 20% of $CaSO_4$ (anhydrite) was produced on the basis of an alkyd binder. To this end, 7 g of alkyd binder (66.5% of alkyd binder, 31.5% of white spirit, 2% of drier) were mixed with 16.5 g of white spirit, 36.2 g of zinc phosphonopropionate and 9.1 g of anhydrite to form a coatable composition which, after drying in air, contains approximately 90.5% of solids (zinc phosphonopropionate and anhydrite in a ratio of 80:20). This paint was applied with a brush and the operation was repeated several times after drying. A firmly adhering, approximately 0.5 mm thick smooth-surface layer of paint was formed, which contained approximately 372 g of zinc phosphonopropionate and 94 g of anhydrite/$m^2$. When this coated plate was heat treated in a muffle furnace heated to 300° C., the layer expanded to form a black carbon-containing foam layer 15 mm thick which adhered firmly to the plate.

A similarly coated steel plate was exposed to a natural gas flame on its coated side.

Temperature was measured by means of thermocouples in the flame and on the underside of the plate. At a flame temperature of approximately 1000° C., the temperature on the underside of the plate increased from room temperature to 460° C. over a period of 3 hours. Under the same conditions, an uncoated plate reached a temperature of 490° C. after only 10 minutes.

It will be appreciated that the instant specification and examples are set forth by way of illustration and not limitation, and that various modifications and changes may be made without departing from the spirit and scope of the present invention.

What is claimed is:

1. A substrate having coated on its surface a flameproofing composition comprising a filler and at least one zinc, calcium, strontium, magnesium, aluminum, chromium (III) or iron salt of phosphonopropionic acid or phosphonosuccinic acid.

2. A substrate according to claim 1, wherein the metal salt is an acid metal salt.

3. A substrate according to claim 1, wherein the salt is a zinc or magnesium salt.

4. A substrate according to claim 1, wherein the salt is primary zinc phosphonopropionate.

5. A substrate according to claim 1, wherein the salt is magnesium phosphonopropionate.

6. The process of flameproofing a substrate which comprises coating said substrate with a flameproofing composition comprising a filler and at least one zinc, calcium, strontium, magnesium, aluminum, chromium (III) or iron salt of phosphonopropionic acid or phosphonosuccinic acid.

* * * * *